Patented May 3, 1927.

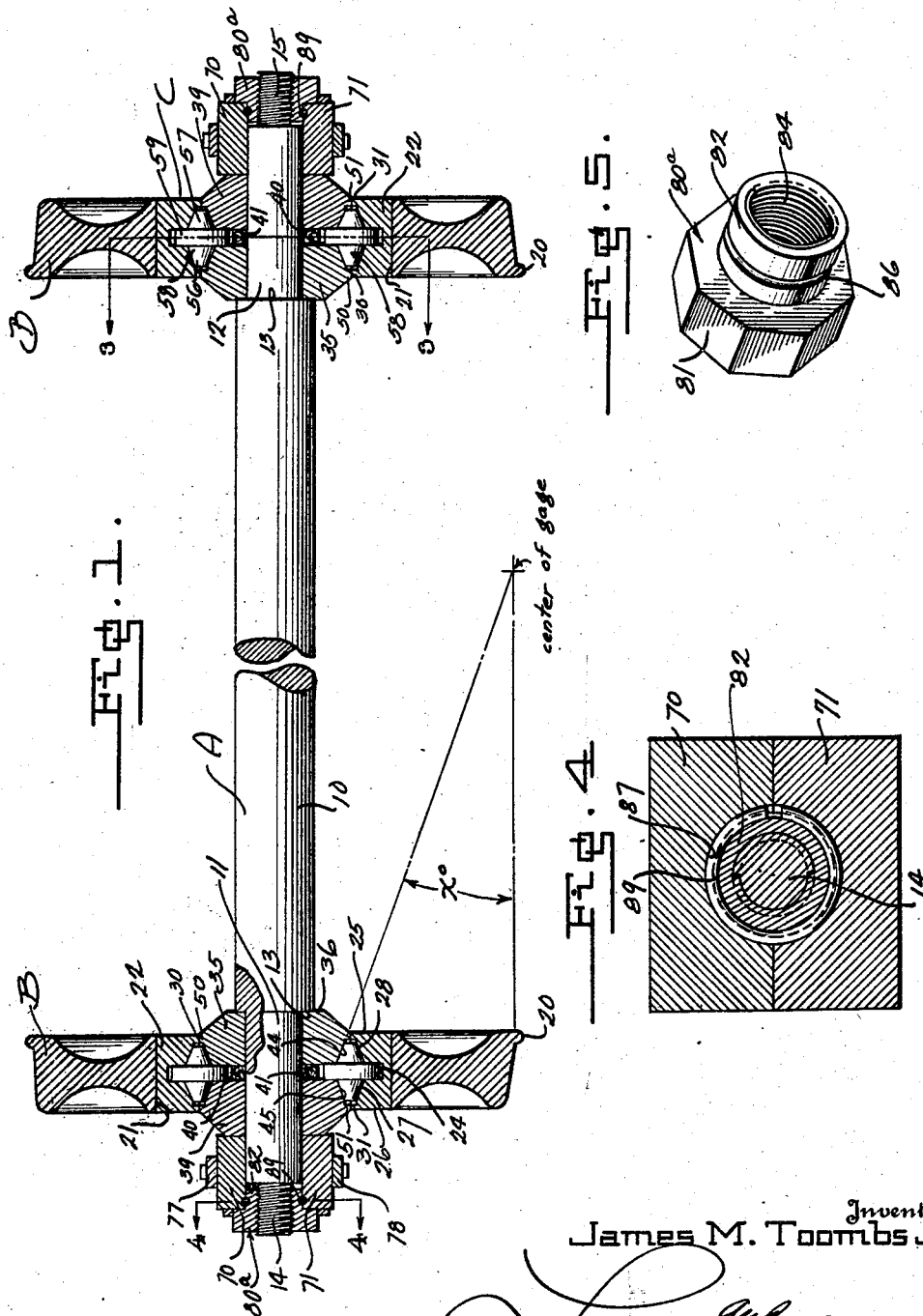

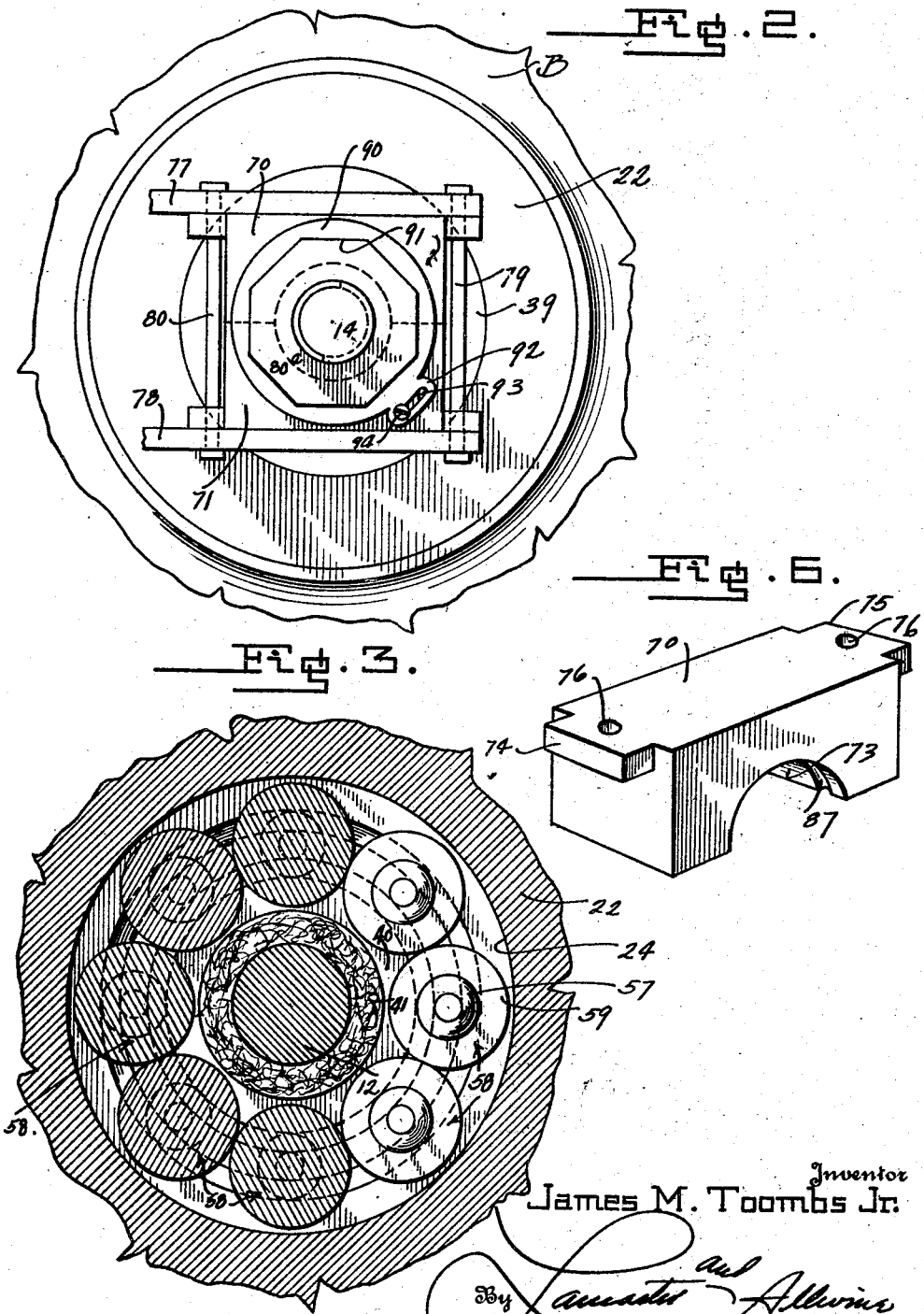

1,626,765

UNITED STATES PATENT OFFICE.

JAMES M. TOOMBS, JR., OF WEBSTER GROVES, MISSOURI.

ROLLER-BEARING CAR WHEEL.

Application filed July 31, 1924. Serial No. 729,375.

This invention relates to improvements in anti-friction bearings.

The primary object of this invention is the provision of an improved adjustable bearing structure of the roller type, primarily adapted for use in connection with the support of car wheels upon their axles.

A further and important object of this invention is the provision of improved anti-friction bearings for the car wheels of railway rolling stock, including novel anti-friction means of a simplified nature for supporting car wheels upon their axles, whereby to reduce the draft tonnage, and to eliminate sharp flanges and wear on curves.

Other objects and advantages of the improved anti-friction bearing for car wheels will be apparent during the course of the following detailed description.

In the accompanying drawings, forming a part of this specification, and wherein similar reference characters designate corresponding parts throughout the several views, Figure 1 is a cross sectional view taken through a railway car axle, showing its supporting wheels mounted upon the improved anti-friction bearing.

Figure 2 is a fragmentary side elevation of the car wheel, showing novel features by which the same is connected to its axle, and which are embodied in this invention.

Figure 3 is a fragmentary cross sectional view taken substantially on the line 3—3 of Figure 1.

Figure 4 is a cross sectional view taken substantially on the line 4—4 of Figure 1.

Figures 5 and 6 are perspective views of details of this invention.

In the drawings, wherein for the purpose of illustration is shown only a preferred embodiment of this invention the letter A may generally designate an axle, upon which the main portions B of car wheel structures are supported by the improved anti-friction bearing and adjusting structures C.

The axle A is of any approved type, including the main body 10 with the reduced spindle extensions 11 and 12 at the outer ends thereof, providing annular shoulders 13 at the juncture thereof with the main body 10. At the outer ends of the externally smooth surfaced spindles 11 reduced screw threaded shanks 14 and 15 are respectively provided, for receiving attaching means to be subsequently described.

As the body portion B and anti-friction means C of the car wheel structures are identical for each of the spindles 11 and 12, but one of the same will be described, the body portion B consists of a ring shaped casting having the outer retaining flange 20 thereon, and providing the opening 21 therethrough which has the outer race 22 of the anti-friction bearing C driven therein with a forced fit.

Referring specifically to the anti-friction and adjusting structure C, the outer race 22 thereof is of ring shaped formation, and provides an annular groove 24 preferably midway between the inner and outer surfaces 25 and 26 respectively thereof, and in a plane parallel with said surfaces. From the annular groove 24 the bearing surfaces 27 and 28 of said outer race diverge, on a taper disposed at any convenient angle as determined by the gauge of the wheels on the axle A. At the sides of the outer race 22 closure flanges 30 and 31 annularly extend inwardly of the passageway through said outer race, extending inwardly from the tapered bearing surfaces 27 and 28, as a means of closing the roller bearings in their compartment within the wheel, as will be subsequently mentioned.

An inner hub structure or inner race is provided as a part of the means C, which consists of the inside section 35 adapted to be shrunk upon one of the spindles 11 or 12 of the axle A, with the inside surface 36 thereof in abutting relation with the spindle shoulder 13. This section is disposed in a spaced cooperating relation with an outer section 39 of the inside race structure; the race section 39 being spaced from the section 35 to provide a groove 40 annularly disposed about the spindle which is adapted to receive felt material or other absorbent packing 41. On each side of the annular groove or space 40, the outer surfaces of the inner race sections 35 and 39 respectively provide the tapered bearing surfaces 44 and 45, disposed in a diverging relation from the passageway or space 40, and at the outside edges of said tapered bearing surfaces 44 and 45, annularly projecting flanges 50 and 51 are provided for the sections 35 and 39 respectively, adapted to cooperate with the inwardly extending flanges 30 and 31 of the outside race 22 in enclosing the roller bearing to be subsequently described.

For the purposes of adjustment, the outside race section 39 of the inner race structure is adjustable along the spindle on which it is positioned, although it has a machined snug fit upon said spindle to prevent its rotation thereabout when the car wheel is rotated about the axle.

Referring to the specific structure of each roller bearing, a plurality of the same are provided in positioned relation between the outer and inner race structures in bearing engagement with the tapered bearing surfaces of said race structures. Each one of these roller bearings is of the same construction, and they are preferably of the double cone type, providing the oppositely disposed frusto-conical cone portions 56 and 57 for each roller bearing 58, with an annular guide flange 59 at the juncture of the cone portions 56 and 57. From the guide flange 59 the cone portions 56 and 57 taper in converging relation toward their peaked ends, and are flat surfaced at said ends.

The anti-friction rollers 58 are positioned so that the guide flanges 59 thereof extend into the guide groove 24 of the outer race structure 22, and the cone portions 56 and 57 rest on the tapered bearing surfaces of the inner and outer race structures above described, and as is illustrated in Figure 1 of the drawings. In this relation the end surfaces of the cone portions 56 and 57 of each roller bearing are spaced a short distance from the enclosing flanges 30, 31, 50 and 51 of the inner and outer race structures, and the outer circumference of the guide flanges 59 of said roller bearings are spaced from the inner circumference of the groove 24 and also from the outer circumference of the spindle on which the anti-friction structure is positioned, to provide space for adjustment as the bearings and bearing surfaces wear.

Referring to that part of the structure C which pertains to the retention of the adjustment of the anti-friction bearings, the same includes that which might be aptly termed a "mock" journal box, consisting of upper and lower sections 70 and 71, each of which provide semi-cylindrical depressions 73 upwardly of the facing surfaces thereof, to receive the spindle ends of the axle A therein. Outwardly extending lugs 74 and 75 are provided at the ends of each section 70 and 71, flush with the outside surfaces of said sections, and which lugs are provided with openings 76 transversely therethrough. Upper and lower arch bars 77 and 78 are provided in resting relation upon the outside surfaces of the sections 70 and 71, and are bolted thereto, as by bolts 79 and 80, which extend through the aligning end openings of the lugs 74 and 75 of the sections 70 and 71, whereby not only to clamp the arch bars to said sections, but also to clamp said sections in a fixed relation about the spindles of the axle A.

Nuts $80^a$ are provided for the screw threaded shanks 14 and 15 of each of the axle spindles, each of these nuts including a polygonal wrench engaging head 81 and a reduced inwardly extending sleeve portion 82, both the head and sleeve being provided with an internally screw threaded passageway 84 for threaded engagement with the shanks 14 and 15 of the axle spindle. The outer circumference of the sleeve portion 82 of each of the nut structures is provided with an annular groove 86 therein, which is adapted to be disposed in a facing relation with the annular grooves 87 provided inwardly of the recesses 73 of the so called "mock" journal box sections 70 and 71. Of course, it is thus apparent that the sleeve portions 82 of the clamping nuts $80^a$ extend into the outer portion of the semi-cylindrical recesses 73 provided by the "mock" journal sections, and the annular grooves 86 and 87 in fact provide an annular passageway for receiving a retaining ring 89, which may be split, and which is provided for connecting the "mock" journal box sections to the clamping nut $80^a$ to prevent any movement of the same away from each other. The retaining ring 89 is of the contractile type and is first placed in the annular groove 86 of the nut sleeve 82, and the sections 70 and 71 of the "mock" journal box structure are then clamped about the axle spindle and the sleeve 82 in such relation that the projecting portions of the retaining ring 89 will enter the annular groove 87 provided by the "mock" journal box sections.

To prevent accidental rotation of the nut with respect to the sections 70 and 71, a substantially ring shaped nut retainer 90 is provided, which preferably has a polygonal opening 91 adapted to be slipped over the nut head 81. This retaining ring 90 has a lateral extension 92 thereon provided with an arcuate slot 93 which is concentrically arranged with the axis of the axle when the retaining ring is in position, and so that a clamping or set screw 94 may be disposed through the slot 93 and engage in one of the "mock" journal box sections whereby to clamp the nut against rotational movement with respect to said sections of the "mock" journal box.

From the foregoing description of the details of this invention it is believed that the manner of adjustment to compensate for any wear on the bearings or bearing surfaces will be apparent. Such take-up of the anti-friction bearings consist of first releasing the nut retaining ring 90, so that the nut $80^a$ may be rotated upon the screw threaded shank 15 of the axle spindle; the bolts 79 and 80 of the "mock" journal box structure of course having been loosened. Upon proper rotation of the nut 80ª the same will then move the "mock" journal box sections against the outermost section 39 of the inner race structure, and slides the same longitudinally inwardly along the spindle. This will shift the anti-friction bearings slightly inward toward the stationary section 35, and move said anti-friction bearings into more snug fitting relation with the tapered bearing surfaces of the inner and outer race structures.

Any additional improved features may be provided in connection with the improved structure herein described, such as a high pressure lubricating system for the anti-friction bearings. It will of course be apparent that the anti-friction bearings will be prevented from binding because of the fact that they are maintained in a true alignment relative to each other by means of the guide flanges 59 thereof extending into the guide groove 24 of the outer race structure 22.

Various changes in the shape, size, and arrangement of parts may be made to the form of the invention herein illustrated and described, without departing from the spirit of the same or the scope of the claims.

I claim:

1. In a device of the class described the combination of an axle, a wheel body, anti-friction bearing means supporting the wheel body on the axle including an adjustable part at the outer side of the wheel body portion slidable along the axle whereby to take up wear on bearing surfaces, a sectional "mock" journal box, means for clamping the sections of the "mock" journal box to the axle outwardly of the wheel body and against the adjustable part of said anti-friction bearing means, and a nut adjustable on the outer end of said axle and operable against the sections of said "mock" journal box to cause movement of the latter along the axle to move the adjustable bearing part above mentioned.

2. In an anti-friction structure of the class described the combination with an axle and a wheel body portion having an opening therethrough, a substantially ring-shaped outer race fixed in the passageway of the wheel body portion and providing an annular groove facing inwardly of the internal periphery thereof, and providing inner bearing surfaces tapering in a diverging relation from said annular groove at opposite sides thereof, an inner race construction on the axle comprising a pair of segments, one of which is fixed with the axle at one side of the plane of the groove of the outer race, the other section of which is slidable along the axle at the opposite sides of the plane of the groove of the outer race, the sections of the inner race construction being spaced at their facing sides to provide an annular groove in the same plane as the annular groove of the outer race, the outer peripheral surfaces of the sections of the inner race construction providing bearing surfaces tapering in a converging relation to the annular groove therebetween, and double cone anti-friction bearings operating on the sloping surfaces of the inner and outer races and including guide flanges fitting in the annular grooves of the inner and outer race constructions.

JAMES M. TOOMBS, Jr.